United States Patent [19]

Mettler et al.

[11] 4,176,700
[45] Dec. 4, 1979

[54] FLEXIBLE TUBULAR CASING ARTICLE

[75] Inventors: Mark F. Mettler, Lombard; Clifford C. Faust, Riverside; Brant A. Loichinger, Orland Park; Walter T. Forrest, Chicago, all of Ill.

[73] Assignee: Union Carbide Corporation, New York, N.Y.

[21] Appl. No.: 817,690

[22] Filed: Jul. 21, 1977

[51] Int. Cl.² .............................................. A45C 13/00
[52] U.S. Cl. ........................................ 150/3; 426/321; 229/38; 229/62; 150/1; 150/7
[58] Field of Search ........................... 150/1, 3, 7, 44; 229/53, 62, 8, 37, 38, 39; 426/321, 332

[56] References Cited

U.S. PATENT DOCUMENTS

| | | | |
|---|---|---|---|
| 527,202 | 10/1894 | Heywood | 150/3 |
| 1,072,987 | 9/1913 | Porter | 150/3 |
| 1,156,847 | 10/1915 | MacDonald | 150/3 |
| 2,013,691 | 9/1935 | Martinson | 229/37 R |
| 2,047,804 | 7/1936 | Shapiro | 229/37 R |
| 2,091,291 | 8/1937 | Ringler | 229/37 R |
| 2,528,332 | 10/1950 | Bergquist | 150/3 |
| 2,715,928 | 8/1955 | Cox | 150/3 |
| 3,163,209 | 2/1965 | Brookins | 150/3 |
| 3,232,480 | 2/1966 | Stanley | 229/37 R |
| 3,253,767 | 5/1966 | Pellaton | 229/37 R |
| 3,450,331 | 6/1969 | Tapiovaara | 229/37 R |

*Primary Examiner*—Ro E. Hart
*Attorney, Agent, or Firm*—David Fink

[57] ABSTRACT

A flexible tubular casing article having an end closure comprising a base portion and a series of triangular flaps extending from said base portion, each of said triangle flaps having a common vertex and being folded, preferably in a common direction, over a portion of an adjacent flap, and anchor means for anchoring said flaps against at least a part of said base portion.

A method of forming the end closure is also included.

15 Claims, 7 Drawing Figures

FIG. 5
FIG. 6
FIG. 7
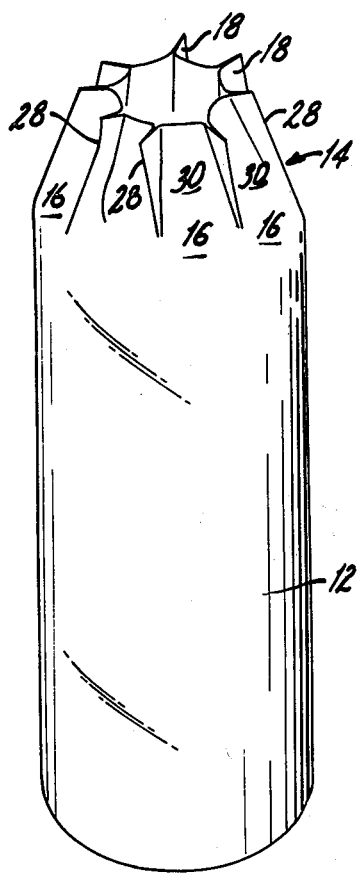
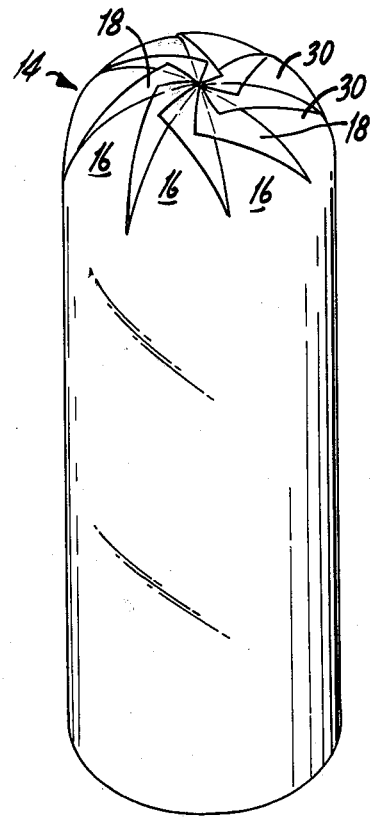
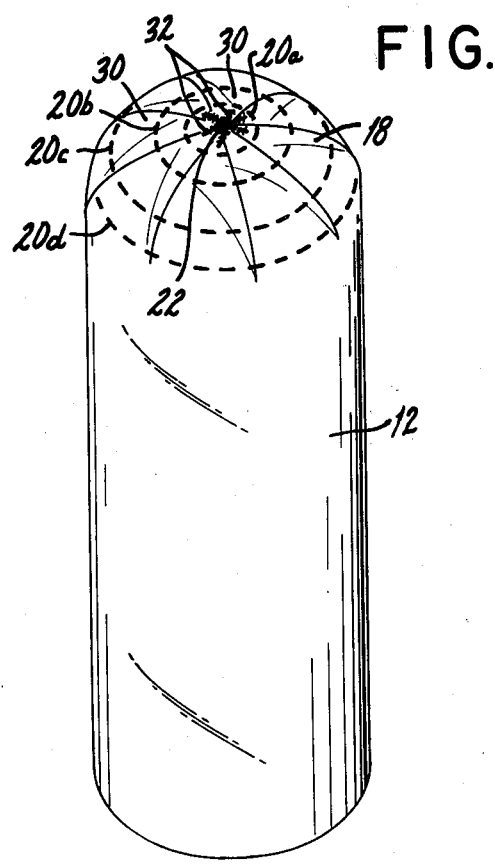

FLEXIBLE TUBULAR CASING ARTICLE

The present invention relates to food casings and, more particularly, to tubular food casings of fibrous tubular materials having an end closure and to methods of making the same.

Thin-wall, flexible tubing prepared from material such as collagen, cellulosic materials, starches, alginates and the like are used extensively as food casings in the preparation of a wide variety of processed food products. Tubular casings used for sausage meat products such as hard salamis and the like are generally supplied in the form of individual cut pieces having a length of from about 12 inches to about 72 inches. Alternatively, such casings may be supplied in the form known in the art as "shirred casing sticks" wherein continuous lengths of tubing ranging from about 30–200 feet or more are shirred and compressed into a tubular stick of from about 12 inches to 24 inches in length.

Automated stuffing and linking apparatus are widely used in the preparation of sausage meat products, such as bologna or liver sausage, substantially eliminating many of the time consuming and expensive manual operations heretofore employed and the use of fibrous shirred casing sticks has played a significant role in automated processing. Automated stuffing apparatus has not proven successful in the case of salami products, however, due to the highly viscous nature of the salami meat emulsion, particularly in the case of hard salami. Accordingly, salami is generally hand stuffed using individual cut pieces of casing.

According to conventional procedures for producing hard salami the problem is that an excessive amount of meat product is wasted in the ends of a hard salami casing before slices of a uniform size can be generated. In some cases, as much as two to three inches of meat must be removed from the end of a stick of hard salami before slices of the same diameter can be cut.

In general the inedible food casings presently available to the trade are provided with end closures of various types depending on the end use requirements. Thus some casings are provided with end closures such as a metal clip or a string tie. The metal clip and string tie are universal in that they are used with many types of casings for several different applications; however, these types of end closures are not used for hard salami. This is because the commercial processors object to the small tail of gathered casing at the end of the closure or the navel made in the emulsion if the casing is turned inside-out.

The two types of closures most commonly used with hard salami are a sewn "S-fold", such as is available from The Brechteen Company, Box 411, Mt. Clemens, Mich., 48043, and a molded bottom available from Kadison Laboratories, Inc., 4141 South Peoria St., Chicago, Ill., 60609.

These types of casing closures are also not entirely satisfactory from a commercial standpoint since the "S-fold" type is sometimes lumpy and uneven when the folds become filled with emulsion and the molded type is very expensive and has a tendency to be lopsided because of structural weaknesses in the molded end.

It would be highly desirable therefore to make available to the art a fibrous food casing such as a food casing for hard salami having an end closure which is easy to manufacture, which provides for an even distribution of emulsion at the closure end and which is relatively inexpensive.

Accordingly it is an object of the present invention to provide an improved end closure for a flexible tubular casing.

Another object is to provide an improved end closure for a fibrous flexible tubular casing for stuffing sausage or other comminuted edible material therein which end closure provides for relatively little food waste in achieving uniform slices of food product during initial slicing.

Another object is to provide a method for producing an end closure for a flexible tubular casing.

These and other objects will be apparent from the following description of the invention taken in conjunction with the accompanying drawing in which:

FIG. 5 is a vertical perspective view of the casing showing the pleating of the end of the casing over the mandrel prior to the formation of the end closure.

FIG. 6 is a view similar to FIG. 5 but showing the pleats in their folded down pattern.

FIG. 7 is a view similar to FIG. 6 but showing the flap portions sewn against the base portion of the end closure and the casing length turned inside-out.

Broadly contemplated, the present invention provides a flexible tubular casing article having an end closure comprising a base portion and a series of triangular flaps extending from said base portion, each of said triangle flaps haing a common vertex and being folded over a part of said base portion, and anchor means for anchoring said flaps against said part of base portion.

According to another aspect of the invention there is provided a method for forming an end closure in an open end of a flexible tubular casing comprising the steps of dividing the open end of the casing into segments, gathering the segments into pleats to form triangular flaps extending from a base portion of said open end, folding the flaps over a part of said base portion and thereafter securing said flaps against said part of the base portion.

In a preferred technique, a mandrel having a shape conforming end is inserted into the interior portion of the tubular casing in a manner such that the open end of the casing surrounds the shape conforming end of the mandrel, and the flaps are formed over the shape conforming end of the mandrel.

Figure 1:
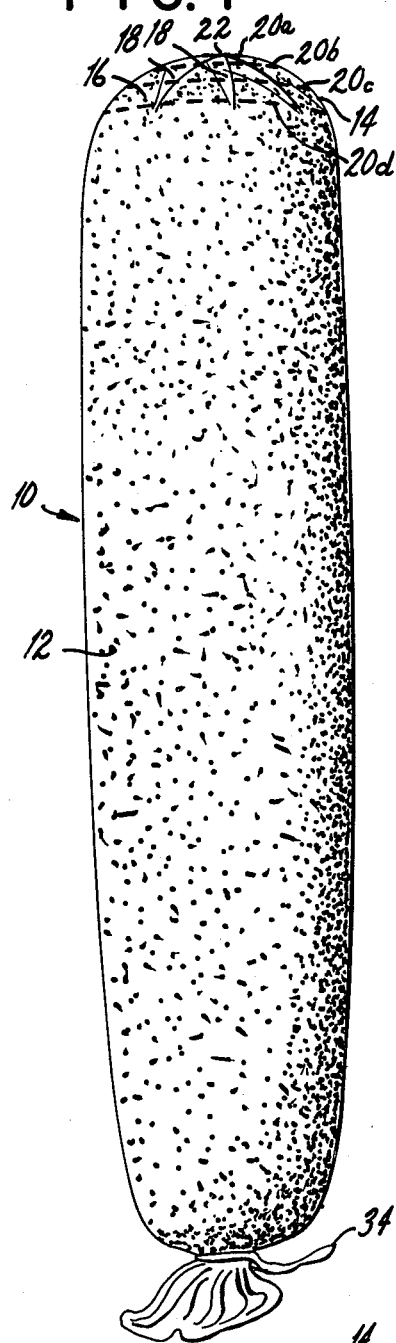
FIG. 1 is a vertical perspective view of a sausage product confined within the flexible tubular casing article of the instant invention.

For a clearer understanding of the present invention reference is made to the drawing and particularly to FIG. 1 wherein reference numeral 10 generally designates a sausage food product encased within the flexible tubular casing 12 of the invention. The materials from which the casing length are manufactured can typically be films fabricated from collagen, unsupported cellulose or fibrous reinforced cellulose, unsupported insolubilized polyvinyl alcohol or fibrous reinforced insolubilized polyvinyl alcohol, polyvinylidene chloride, polyvinylchloride, polyesters, and polyolefins such as polyethylene, or any other suitable material, and can be either single or multilayer films of such film materials. The preferred casing material is a fibrous casing material such as a fibrous reinforced cellulose or a fibrous reinforced insolubilized polyvinyl alcohol.

Figure 2:
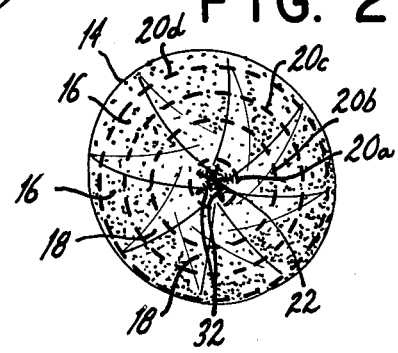
FIG. 2 is an end view of the article of FIG. 1 showing the "pin-wheel" end closure.

Referring to FIGS. 1 and 2, situated at one end of the flexible tubular casing 12 is an end closure 14 having a base portion 16 and a series of curvilinear triangular flaps 18 extending from the base portion which are folded against a part of the base portion 16 and anchored thereto. Each flap (or pleat) is, preferably, also folded over a portion of an adjacent flap and is anchored against said part of the base portion 16 and against the underlying portion of adjacent flap. In addition, it is preferable that the flaps be folded in a common direction in order to produce a finished end closure having a more uniform and attractive appearance.

The flaps 18 can be anchored to the base portion 16 and underlying adjacent flap 18 by any suitable technique such as by adhering the flaps with conventional adhesive materials. The type of adhesive materials utilized would, of course, depend upon the materials of construction of the casing. Thus, depending upon the type of materials constituting the casing length, the adhesion can be effected by heat sealing, utilization of hot melt adhesives, etc.

The preferred anchoring method for securing the flaps against the base portion 16 is a series of stitches forming at least one substantially circular stitch line across the flaps and base portion. Preferably, a series of concentrically disposed stitch lines 20a, 20b, 20c and 20d is utilized as best seen in FIG. 2. The number and size of the concentrically disposed circles formed by the stitch lines can be varied over a relatively wide range without drastically altering the resultant end closure. While a single stitch line can be used to anchor the flaps to the base portion, as a general rule at least three concentrically disposed stitch lines can be utilized to anchor the flaps to the base portion 16 and to the portion of underlying adjacent flap 18, with one of the stitch lines being disposed proximate the vertex of the triangular flaps (inner stitch line), one of said lines being disposed near the outer end of the flaps (outer stitch line), and one being disposed intermediate the inner and outer stitch lines. It is preferred, however, that at least four concentrically disposed stitch lines be utilized to adhere the flaps 18 to the base portion 16 and to each other with two of said stitch lines being disposed in between the outer and inner stitch lines.

Thus referring again to FIGS. 1 and 2, which illustrate the preferred arrangement, four such stitch lines are indicated, identified as inner stitch line 20a, intermediate stitch lines, 20b, 20c, and outer stitch line 20d. The diameter of the concentrically disposed stitch lines can be varied. However the outer stitch line 20d should be positioned so that the outermost edge points of the flaps are prevented from unfolding when the tubular casing article is filled up with emulsion. Merely as illustrative, a typical arrangement is as follows:

| Concentric Stitch Line | Diameter |
| --- | --- |
| 20a | 15/16" |
| 20b | 1 3/4" |
| 20c | 2 1/2" |
| 20d | 3" |

During stuffing operation, it has been found that there can be a tendency for a small amount of emulsion to "leak through" the center of the end closure for large size casing. Provision for preventing escape of such emulsion is made by means of vertex closure 22 formed by cross-stitching the inner edge of the flaps at the common vertex disposed interiorly of the inner stitch line 20a by means of cross-stitches 32 as shown in FIG. 2. The number of cross-stitches needed to adequately prevent emulsion leak-through during stuffing will depend upon the size of casing, but three cross-stitches have generally been found to be adequate for large size casing. Alternatively the flaps can be anchored together at the common vertex by use of a suitable adhesive or by equivalent means such as heat sealing.

The number of triangular flaps can also be varied over a relatively wide range. Thus the number of flaps can be three or more, but will preferably be six to eight flaps and most preferably eight flaps. Tubular articles having end closures of this invention can be made with an even number of flaps, i.e. 4, 6, 8 or 10 flaps, or from an odd number of flaps, i.e. 5, 7 or 9.

Figure 4:
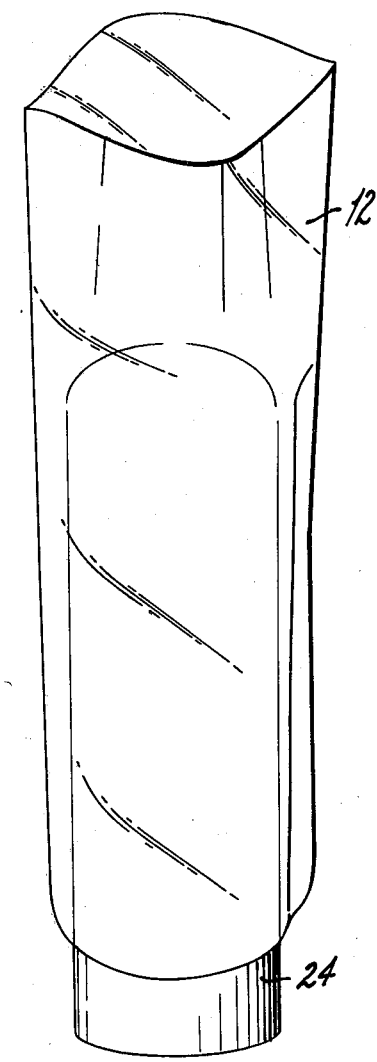
FIG. 4 is a vertical view showing the tubular casing inserted over the mandrel of FIG. 3.
Figure 3:
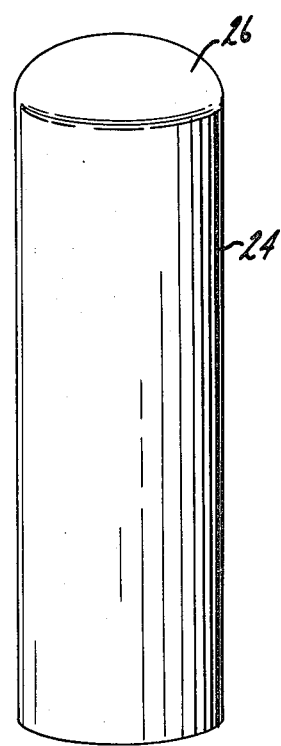
FIG. 3 is a vertical view of a typical mandrel which can be used to form the end closure of the instant invention.

The mandrel illustrated in FIG. 3 by reference numeral 24 can be formed of a generally inflexible material and can be constructed completely solid throughout or it can have a hollow bore extending a portion of the vertical distance of the mandrel. The upper edge or shape conforming end 26 of the mandrel 24 generally determines the final shape of the end closure and is shown as having a generally hemispherical configuration. The mandrel is adapted to be inserted into the interior of casing length 12 as shown in FIG. 4.

The method of forming the end closure of tubular casing article of the instant invention is depicted in FIGS. 4-7 and involves the utilization of the mandrel shown in FIG. 3. In general, the end closure 14 is made by a combination of pleating and forming, i.e., as the pleats or flaps are made, they are folded, preferably in a common direction, over the shape conforming end 26 of the mandrel 24 and thereafter anchored into position as explained previously. The shape conforming end 26 of the mandrel will generally dictate the final form of the end closure, i.e., as the pleats are folded in place, they will assume the same general shape as the shape conforming end of the mandrel. However, the number of pleats and the stitching pattern will also influence the final shape.

In order to form the pleats or flaps of the end closure 14, an end portion of the casing length 12 is divided into as many parts (fold lines 28) as desired (for purpose of illustration 8 such fold lines are) shown in FIG. 5. Preferably, the end portion is divided into substantially equal parts in order to give the finished end closure a more uniform and attractive appearance. The pleats can be formed while the mandrel is positioned in the interior portion of casing length 12 or alternatively the pleats can be preformed, i.e. prior to inserting the mandrel into the interior portion of the casing length 12.

Casing material is thereafter gathered on either side of each fold line 28 to form curvilinear triangular flaps with the fold line being in substantially perpendicular relationship to the base portion 16, i.e. the material of the end closure not constituting a flap. The flaps are thereafter folded over, preferably in a common direction as shown, to form a common vertex, i.e. clockwise or counter-clockwise against a part 30 of the base portion 16 which lies between adjacent flaps, and against the shape conforming end 26 of the mandrel 24. The amount of material gathered to form the pleats or flaps should be such that when the flaps are folded in a common direction against the part 30 of the base portion 16, each flap is folded over a portion of an adjacent flap as shown in FIG. 6. After the flaps have been folded over the part of the base portion and the end closure has assumed the shape of the shape conforming end 26, it is necessary that the flaps be anchored in place against the part 30 of the base portion 16. Thus referring to FIG. 7, it will be seen that the flaps 18 are anchored in place against the part 30 of the base portion 16 by means of the four concentrically disposed stitch lines 20a, 20b, 20c and 20d and a vertex closure 22 is formed by crisscross stitch lines 32 which prevents emulsion leakage as explained previously. The finished closure resembles a "pin-wheel" configuration. The other end of the casing can be closed by conventional means such as by a string tie closure 34, as shown in FIG. 1, when the casing of the instant invention has been stuffed with meat emulsion to form a sausage product.

It will be evident from the foregoing description that the end closure for the tubular casing article of the instant invention eliminates many of the disadvantages of prior art articles. The end closure of the instant invention eliminates the small tail of gathered casing at the end of the closure or the navel made in the emulsion if the casing is turned inside-out which is characteristic of some of the prior art articles. Moreover the end closure does not appear lumpy or uneven when the end closure is filled with emulsion as is also characteristic of some prior art tubular casing articles. Advantageously, the tubular casing article of the instant invention can be turned inside-out, if desired, so that an external coating, such as a moisture proof coating of polyvinylidene chloride, will end up on the inside of the casing, yet the shape and the appearance of the casing end closure will not be detrimentally effected. However, the casing of the instant invention need not be turned inside-out since the shape and appearance of the end closure remains substantially the same whether the casing is used as produced or used after turning inside-out. In contrast, many prior art casings, such as the "S-fold" casing, must be turned inside-out for use in order to produce a sausage product having an acceptable appearance on the end.

Alternative embodiments and modes of practicing the invention, but within its spirit and scope, will, in the light of this disclosure, occur to persons skilled in the art. It is intended, therefore, that this description be taken as illustrative only and not be construed in any limiting sense.

What is claimed is:

1. A flexible tubular food casing article having an end closure comprising a base portion and a series of triangular flaps extending from said base portion, each of said triangular flaps having a common vertex and being folded over a portion of an adjacent flap, and anchor means for anchoring said flaps against at least a part of said base portion including a connection between said flaps and said base portion, said end closure defines a curved surface.

2. A flexible tubular food casing article according to claim 1 wherein said triangular flaps are folded in a common direction.

3. A flexible tubular food casing article according to claim 1 wherein said anchor means include means for anchoring said flaps against the underlying portion of the adjacent flap.

4. A flexible tubular food casing article according to claim 1 having at least three flaps extending from said base portion.

5. A flexible tubular food casing article according to claim 1 having from 6 to 8 flaps extending from said base portion.

6. A flexible tubular food casing article according to claim 1 wherein said anchor means include an adhesive.

7. A flexible tubular food casing article according to claim 1 wherein said anchor means include a heat seal.

8. A flexible tubular food casing article according to claim 1 wherein said flaps are anchored against said base portion by a series of stitches forming at least one stitch line across said flaps and said base portion.

9. A flexible tubular food casing article according to claim 8 wherein said stitches comprise at least three concentrically disposed stitch lines.

10. A flexible tubular food casing article according to claim 8 wherein said stitches comprise at least four concentrically disposed stitch lines, one of said stitch lines being an outer stitch line disposed near an outer end of said flaps, and one of which is an inner stitch line disposed near an inner end of said flaps.

11. A flexible tubular food casing article according to claim 10 including a vertex closure formed by cross-stitching said flaps together interiorly of said inner stitch line at said common vertex.

12. A flexible tubular food casing article according to claim 1 including means anchoring said flaps to each other at said common vertex.

13. A flexible tubular food casing article according to claim 12 including a vertex closure formed by cross-stitching said flaps together at said common vertex.

14. The flexible tubular food casing article according to claim 1 wherein said food casing is a fibrous food casing.

15. The flexible tubular food casing article according to claim 1 wherein said end closure defines a portion of a spheroidal surface.

* * * * *